US011522179B2

(12) United States Patent
Kim et al.

(10) Patent No.: US 11,522,179 B2
(45) Date of Patent: Dec. 6, 2022

(54) NEGATIVE ELECTRODE AND SECONDARY BATTERY COMPRISING THE SAME

(71) Applicant: LG CHEM, LTD., Seoul (KR)

(72) Inventors: Young Jae Kim, Daejeon (KR); Jung Woo Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 113 days.

(21) Appl. No.: 16/561,685

(22) Filed: Sep. 5, 2019

(65) Prior Publication Data
US 2020/0075941 A1 Mar. 5, 2020

(30) Foreign Application Priority Data
Sep. 5, 2018 (KR) .................. 10-2018-0106028

(51) Int. Cl.
*H01M 4/38* (2006.01)
*H01M 10/0525* (2010.01)
*H01M 4/13* (2010.01)
*H01M 4/62* (2006.01)
*H01M 4/587* (2010.01)
*H01M 4/134* (2010.01)
*H01M 10/052* (2010.01)
*H01M 4/36* (2006.01)

(52) U.S. Cl.
CPC ............. *H01M 4/386* (2013.01); *H01M 4/13* (2013.01); *H01M 4/134* (2013.01); *H01M 4/587* (2013.01); *H01M 4/622* (2013.01); *H01M 4/625* (2013.01); *H01M 10/052* (2013.01); *H01M 10/0525* (2013.01); *H01M 4/364* (2013.01)

(58) Field of Classification Search
CPC ........ H01M 4/386; H01M 4/622; H01M 4/13; H01M 4/134; H01M 10/0525
See application file for complete search history.

(56) References Cited

U.S. PATENT DOCUMENTS

| 11,075,408 B2* | 7/2021 | Ji | H01M 4/134 |
| 2008/0286653 A1* | 11/2008 | Sano | H01M 4/8652 |
| | | | 429/217 |
| 2011/0287317 A1* | 11/2011 | Nakanishi | H01M 10/052 |
| | | | 429/218.1 |

(Continued)

FOREIGN PATENT DOCUMENTS

| KR | 10-1617668 B1 | 5/2016 | |
| WO | WO-2014207967 A1 * | 12/2014 | H01M 4/134 |
| WO | WO-2018097213 A1 * | 5/2018 | H01M 4/133 |

*Primary Examiner* — Ula C Ruddock
*Assistant Examiner* — Mary Grace Byram
(74) *Attorney, Agent, or Firm* — Morgan, Lewis & Bockius LLP

(57) ABSTRACT

The present invention relates to a negative electrode including a current collector and a negative electrode active material layer disposed on the current collector, wherein the negative electrode active material layer includes a negative electrode active material, carbon black, and a binder, wherein the negative electrode active material includes silicon particles, and the binder includes a copolymer containing a unit derived from a poly(vinylalcohol) (PVA) and a unit derived from an ionized and substituted acrylate, the binder being included in the negative electrode active material layer in an amount of 18 wt % to 22 wt %.

17 Claims, 6 Drawing Sheets

(56) References Cited

U.S. PATENT DOCUMENTS

| | | | | |
|---|---|---|---|---|
| 2012/0070737 | A1* | 3/2012 | Son | C08J 3/247 |
| | | | | 429/217 |
| 2012/0214000 | A1* | 8/2012 | Kyrlidis | H01G 11/24 |
| | | | | 428/402 |
| 2015/0380726 | A1* | 12/2015 | Nakanishi | H01M 4/38 |
| | | | | 429/220 |
| 2016/0156024 | A1* | 6/2016 | Kinpara | H01M 10/052 |
| | | | | 252/511 |
| 2019/0312257 | A1* | 10/2019 | Ishiwatari | H01M 4/483 |

* cited by examiner

NEGATIVE ELECTRODE AND SECONDARY BATTERY COMPRISING THE SAME

TECHNICAL FIELD

CROSS-REFERENCE TO RELATED APPLICATIONS

This application claims the benefit of Korean Patent Application No. 10-2018-0106028, filed on Sep. 5, 2018 in the Korean Intellectual Property Office, the disclosure of which is incorporated herein in its entirety by reference.

TECHNICAL FIELD

The present invention relates to a negative electrode including a current collector and a negative electrode active material layer disposed on the current collector, wherein the negative electrode active material layer includes a negative electrode active material, carbon black, and a binder, wherein the negative electrode active material includes silicon particles, and the binder includes a copolymer containing a unit derived from a poly(vinylalcohol) (PVA) and a unit derived from an ionized and substituted acrylate, the binder being included in the negative electrode active material layer in an amount of 18 wt % to 22 wt %.

BACKGROUND ART

In recent years, as technology development and demand for mobile devices have increased, the demand for secondary batteries as an energy source has been rapidly increased. Accordingly, various studies are being conducted on batteries capable of meeting various needs. Particularly, research has been actively conducted on a lithium secondary battery having a high energy density and having excellent lifespan and cycle properties as a power source of such devices.

A lithium secondary battery means a battery including a positive electrode containing a positive electrode active material capable of intercalation/de-intercalation of lithium ions, a negative electrode containing a negative electrode active material capable of intercalation/de-intercalation of lithium ions, and an electrode assembly having a separator interposed between the positive electrode and the negative electrode and including a non-aqueous electrolyte containing lithium ions included in the electrode assembly.

As the negative electrode active material, a lithium metal, a lithium alloy, crystalline or amorphous carbon, a carbon composite, a silicon-based active material, and the like are used. Among the above, the silicon-based active material is used alone or in combination with another negative electrode active material to improve the capacity of a secondary battery.

Particularly, silicon particles (pure silicon) in the silicon-based active material have a very high capacity, and thus, when the silicon particles are used to form a negative electrode active material, the capacity properties of a secondary battery may be greatly improved. However, the silicon particles have a problem in that the volume thereof excessively expands as charging and discharging of a battery progress. Accordingly, the structure of a negative electrode is changed to separate the negative electrode active material, between the carbon black, or between the negative electrode active material and a current collector, thereby lengthening a conductive path in the negative electrode, so that negative electrode resistance is increased. Therefore, it is practically difficult to compose a negative electrode active material only with silicon particles.

A binder included in a negative electrode and used together with a negative electrode active material, the binder such as carboxymethylcellose (CMC) and styrene butadiene Rubber (SBR), complements the adhesion of constituting materials such as a negative electrode active material and carbon black. Therefore, some problems caused by the volume expansion may be solved, but the effect is not significant. Meanwhile, a method for controlling volume expansion by forming a carbon coating layer on the surfaces of silicon particles has been also proposed. However, the method requires a separate process and capacity is inevitably reduced due to the reduction in silicon content.

Therefore, the present invention provides a negative electrode of a new configuration capable of suppressing the increase in resistance due to volume expansion even when silicon particles (pure silicon) are used as a negative electrode active material

DISCLOSURE OF THE INVENTION

Technical Problem

An aspect of the present invention provides a negative electrode and a secondary battery in which silicon particles are used as a negative electrode active material, thereby improving the capacity of the battery, and simultaneously, a conductive path is maintained despite the volume expansion of the silicon particles, thereby suppressing the increase in resistance of the negative electrode and improving the lifespan properties of the battery.

Technical Solution

According to an aspect of the present invention, there is provided a negative electrode including a current collector and a negative electrode active material layer disposed on the current collector, wherein the negative electrode active material layer includes a negative electrode active material, carbon black, and a binder, wherein the negative electrode active material includes silicon particles, and the binder includes a copolymer containing a unit derived from a poly(vinylalcohol) (PVA) and a unit derived from an ionized and substituted acrylate, the binder being included in the negative electrode active material layer in an amount of 18 wt % to 22 wt %.

According to another aspect of the present invention, there is provided a secondary battery including the negative electrode, a positive electrode, a separator interposed between the positive electrode and the negative electrode, and an electrolyte.

ADVANTAGEOUS EFFECTS

According to the present invention, silicon particles are used as a negative electrode active material, so that the capacity of a battery may be greatly improved. In addition, despite the volume expansion of the silicon particles during charging and discharging, a conductive path is maintained since a specific binder is used, so that the increase in battery resistance may be suppressed. Accordingly, the lifespan properties of a negative electrode may be improved.

MODE FOR CARRYING OUT THE INVENTION

Figure 1:
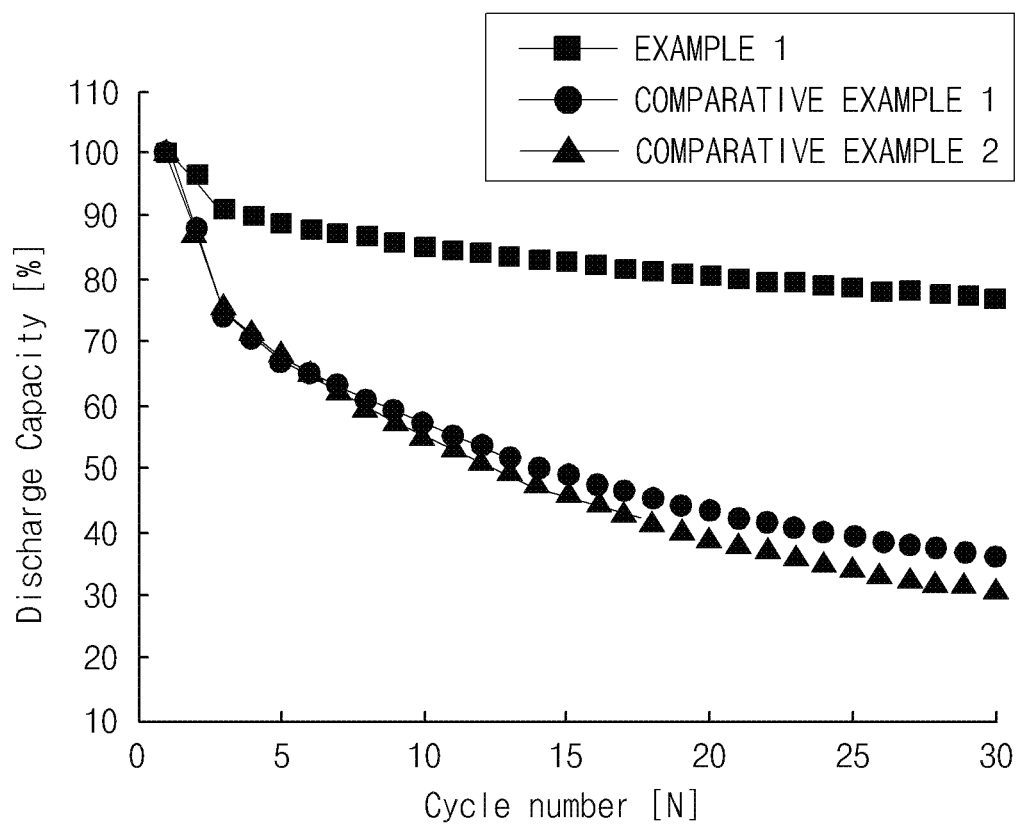
FIG. 1 is a graph showing the capacity retention rate according to cycle of batteries using the negative electrode of Example 1, Comparative Example 1, and Comparative Example 2, respectively.

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present specification, an average particle diameter ($D_{50}$) may be defined as a particle diameter corresponding to 50% of the cumulative amount in a particle diameter distribution curve of particles. The average particle diameter ($D_{50}$) may be measured by, for example, a laser diffraction method. With the laser diffraction method, it is generally possible to measure a particle diameter of from sub-microns to several millimeters and obtain results having high reproducibility and high resolution. In addition, $D_{10}$ and $D_{90}$ are particle diameters corresponding to 10% and 90% of the cumulative amount in the particle diameter distribution curve, respectively.

<Negative Electrode>

A negative electrode according to an embodiment of the present invention includes a current collector and a negative electrode active material layer disposed on the current collector, wherein the negative electrode active material layer includes a negative electrode active material, carbon black, and a binder, wherein the negative electrode active material includes silicon particles, and the binder includes a copolymer containing a unit derived from a poly(vinylalcohol) (PVA) and a unit derived from an ionized and substituted acrylate. The binder may be included in the negative electrode active material layer in an amount of 18 wt % to 22 wt %.

The negative electrode may include a current collector. The current collector is not particularly limited as long as it has conductivity without causing a chemical change in the battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which readily adsorbs carbon such as copper and nickel may be used as the current collector. The thickness of the current collector may be from 6 μm to 20 μm, but the thickness of the current collector is not limited thereto.

The negative electrode active material layer may be disposed on the current collector. The negative electrode active material layer may cover one surface or both surfaces of the current collector. The negative electrode active material layer may include a negative electrode active material, carbon black, and a binder.

(1) Negative Electrode Active Material

The negative electrode active material may include silicon particles, and specifically, may be composed of the silicon particles. The silicon particles correspond to particles composed of silicon (Si) only, and specifically, may be pure silicon. The silicon particles is a material having a high capacity when compared with other negative electrode active materials such as carbon-based active material particles, SiO, and Si/C, and thus, when the silicon particles are used as a negative electrode active material, the capacity of a battery may be greatly improved. However, during the charging and discharging of a battery, the volume of the silicon particles is excessively expanded, thereby causing the de-intercalation of a negative electrode active material and the disconnection of a conductive path, which deteriorate the lifespan properties of the battery. However, in the present invention, the above problems may be solved by controlling other components and variables, such as using a specific binder and controlling the content thereof, so that the silicon particles may be used as negative electrode active material particles.

The average particle diameter ($D_{50}$) of the silicon particles may be 4 μm to 10 μm, specifically 4.5 μm to 8 μm, and more specifically 5 μm to 7 μm. When the silicon particles in the above average particle diameter range are used, the viscosity of negative electrode slurry formed during the manufacturing of a negative electrode is not excessively increased, so that processibility may be secured, and the possibility of settling of the silicon particles in the negative electrode slurry is lowered, so that phase stability may be ensured.

When the silicon particles have an above average particle diameter, a binder may be adsorbed onto the silicon particles and uniformly coated thereon. Particularly, unlike styrene butadiene rubber (SBR) which is adhered to a negative electrode active material in the form of a dot, a binder including in the negative electrode of the present invention may be adhered to the silicon particles in the form of a plane, and thus, may be more smoothly and uniformly coated. In addition, when the silicon particles having the average particle diameter are used, a binder is adsorbed onto the silicon particles in an appropriate amount, thereby contributing to suppressing the excessive volume expansion of the silicon particles and preventing the disconnection of a conductive path. Simultaneously, a binder left in the state of not being adsorbed onto the surfaces of the silicon particles contributes to maintaining the phase stability of the entire negative electrode slurry. Specifically, since a binder acts as resistance to the settling of a negative electrode active material, the negative electrode active material may be uniformly dispersed in the negative electrode slurry, thereby enabling the preparation of stable negative electrode slurry.

That is, the above average particle diameter range corresponds to an optimum particle diameter range which derives an appropriate ratio of a binder contributing to the volume expansion of silicon particles and the rest of the binder contributing to maintaining the phase stability of negative electrode slurry.

The silicon particles may have a $D_{10}$ of 0.2 µm or greater and a $D_{90}$ of 20 µm or less, and the difference between the $D_{10}$ and the $D_{90}$ may be 15 µm or less. When the above is satisfied, the capacity retention rate after continuous charging and discharging may be improved.

In some cases, the negative electrode active material may further include graphite. The graphite may be natural graphite and/or artificial graphite. In this case, the output of a battery may be improved.

The negative electrode active material may be included in the negative electrode active material layer in an amount of 60 wt % to 80 wt %, specifically 65 wt % to 75 wt %, and more specifically 68 wt % to 72 wt %. When the above range is satisfied, the energy density of the negative electrode may be formed at a high level while the contents of carbon black and a binder are maintained at a desired level.

(2) Carbon Black

The carbon black serves as a conductive material for maintaining a conductive path in the negative electrode.

The carbon black is excellent in chemical stability and may smoothly contact approaching carbon black, and thus, is preferable in terms of forming a stable conductive path. The carbon black may be at least one selected from the group consisting of acetylene black, furnace black, and Ketjen black.

The specific surface area of the carbon black may be 70 $m^2/g$ or less, specifically 35 $m^2/g$ to 70 $m^2/g$, and more specifically 50 $m^2/g$ to 65 $m^2/g$. The binder used in the present invention is an aqueous binder which dissolves well in water, and accordingly, a solvent becomes water when preparing negative electrode slurry. Accordingly, the carbon black must be dispersed well in water, and for this purpose, it is preferable that the specific surface area of the carbon black satisfies the above range. Specifically, only when the carbon black satisfies an appropriate specific surface area range, the viscosity of negative electrode slurry is prevented from being excessively increased, so that processing is smoothly performed and a conductive path in the negative electrode slurry may be uniformly formed. In particular, in the present invention, depending on the use of silicon particles and a specific binder, the content of the carbon black may be increased. In the case of using a high content of carbon black, the dispersibility improvement is more important.

When heat treated at 600° C. to 700° C. for 90-180 minutes, the carbon black may have a weight loss rate of 0.05% to 0.25%, specifically 0.05% to 0.2%, and more specifically 0.1% to 0.2%.

The weight loss rate may be calculated as follows.

Weight loss rate=[(Weight of carbon black before heat treatment−Weight of carbon black after heat treatment)/Weight of carbon black before heat treatment]×100

The amount of carbon black lost by the heat treatment may correspond to a functional group present on the surface of the carbon black before the heat treatment. The functional group may be at least one functional group selected from the group consisting of a hydroxy group, a carboxy group, an aldehyde group, a phenol group, a ketone group, an anhydride group, a lactone group, a peroxide group, an ether group, a hemiacetal group, a quinone group, and an amine group. When the weight loss rate satisfies the above range, there are sufficient functional groups present on the surface of the carbon black, so that when water is used as a solvent, the carbon black may be smoothly dispersed in the solvent. In particular, in the present invention, depending on the use of silicon particles and a specific binder, the content of the carbon black may be increased. In the case of using a high content of carbon black, the dispersibility improvement is more important. Specifically, when the dispersibility of the carbon black is improved, even when the content of the carbon black is increased in negative electrode slurry having the same solid content, the viscosity of the negative electrode slurry may be maintained at an appropriate level, so that processability may be stably maintained to improve the uniformity of a negative electrode to be formed.

The carbon black may be included in the negative electrode active material layer in an amount of 7 wt % to 13 wt %, specifically 8 wt % to 12 wt %, and more specifically 9 wt % to 11 wt %. When the above range is satisfied, the resistance in a negative electrode into which an excessive amount of binder is injected may be reduced. In addition, through a sufficient content of carbon black, the disconnection of a conductive path according to the volume change of silicon particles may be minimized. The above range may be greater than the content range of carbon black in a typical negative electrode. When the content of the carbon black is increased, the content of the negative electrode active material, particularly the content of the silicon particles, may be decreased relatively. However, since the capacity of the silicon particles is high, the capacity of a battery may be secured even with a small content of the silicon particles. In other words, since the capacity of a battery may be secured even with a small content of silicon, the content of carbon black may be increased to reduce resistance in the negative electrode.

(3) Binder

The binder may include a copolymer containing a unit derived from a poly(vinylalcohol) and a unit derived from an ionized and substituted acrylate, and specifically, may be composed of the copolymer.

In the case of a typical secondary battery negative electrode, both an aqueous manufacturing and a non-aqueous manufacturing are available. In the case of the aqueous manufacturing, carboxymethylcellose (CMC) or styrene butadiene rubber (SBR) is typically used as a binder. Due to the volume change of a negative electrode caused by the charging and discharging of a battery, cracks are generated among negative electrode active materials and a conductive path in the negative electrode is disconnected. Particularly, when silicon particles are used as a negative electrode active material, the volume thereof is excessively expanded, thereby deteriorating the lifespan properties of the battery. The above problems may not be completely solved with a typical binder alone.

However, in the present invention, the binder includes the copolymer containing the unit derived from a poly(vinylalcohol) and the unit derived from an ionized and substituted acrylate, so that the above problem may be solved. Specifically, the copolymer may ensure phase stability and adhesion even though it is a single binder, thereby not only simplifying a manufacturing process but also increasing the solid content of negative electrode slurry, suppressing the disconnection of a conductive path due to the volume expansion of a negative electrode active material, preventing, with the excellent adhesion thereof, the deformation of a negative electrode despite the volume change of the negative electrode, and ensuring excellent charge/discharge lifespan properties. Particularly, the copolymer has the unit derived from an ionized and substituted acrylate, so that the adhesion may be significantly improved compared with when the unit derived from an acrylate not ionized and unsubstituted is contained.

Specifically, when the copolymer is used together with the silicon particles, there are effects as follows. Silicon particles are excessively expanded during charging and discharging. In the case of carboxymethylcellulose (CMC) or styrene butadiene rubber (SBR) which is typically used as a binder, when the silicon particles are expanded, CMC or SBR adsorbed onto the silicon particles is not broken but stretched, and is not restored. Accordingly, there is a problem in that a conductive path between the silicon particles or a network therebetween is not maintained. However, in the case of the copolymer, when the silicon particles are expanded, a portion of the copolymer is broken and a minimum amount of the rest of the copolymer which may act as sufficient resistance to the volume expansion is present in the state of being adsorbed onto the silicon particles, thereby serving to suppress the volume expansion of the silicon particles. In addition, accordingly, a conductive path between the silicon particles or a network therebetween may be maintained. Accordingly, the lifespan properties of the battery may be improved.

The unit derived from an ionized and substituted acrylate may be formed by a process of copolymerizing an alkyl acrylate with a monomer, and then adding an excessive amount of an ionic aqueous solution thereto to perform substitution. At this time, in the final copolymer structure, the unit derived from an ionized and substituted acrylate may be regarded as a unit derived from an ionized and substituted acrylate based on a final ionized and substituted polymer regardless of an acrylate (for example, an alkyl acrylate such as methyl acrylate) used as a raw material.

In the copolymer, the molar fraction of the unit derived from an ionized and substituted acrylate except for the unit derived from a poly(vinylalcohol) may be 98 mol % to 100 mol %, specifically 100 mol %. The phrase "100 mol %" means that the rest of the units, except for the unit derived from a poly(vinylalcohol), are the units derived from an ionized and substituted acrylate, and that a unit derived from an acrylate that is not ionized and substituted is not present. The phrase "98 mol % or greater" means that when the substitution process is performed to deliberately ionize all hydrogens in a unit derived from an acrylate, a unit derived from an acrylate which has not been ionized and substituted is present. At this time, the content of the unit derived from an acrylate that is not ionized and substituted is small, the content being in an error range (for example, less than 2 mol %).

The unit derived from an acrylate that is not ionized and substituted includes a hydroxy group (—OH). When the unit derived from an acrylate that is not ionized and substituted is contained in the copolymer in a large amount, for example, in an amount of 2 mol % or greater, after the negative electrode slurry is dried, the crystallization progresses at a high level due to hydrogen bonding force, so that the copolymer is broken easily. Accordingly, the amount of 'unbroken copolymers' which may suppress the volume expansion of the silicon particles is significantly reduced, and the amount of copolymers adsorbed onto the silicon particles is reduced. Accordingly, the adhesion between the negative electrode active material layer and the current collector is lowered and the lifespan properties of the battery are deteriorated.

However, the copolymer used in the present invention does not contain the unit derived from an acrylate that is not ionized and substituted, or contain the same in a small content of less than 2 mol % (error range). At this time, due to a metal cation substituting hydrogen, the degree of graphitization of the copolymer is lowered to an appropriate level. Accordingly, even when some copolymers are broken at the time of the volume expansion of the silicon particles, the rest of the copolymers are adsorbed onto the silicon particles in the state of not being broken, so that the adhesion between the negative electrode active material layer and the current collector may be improved and the lifespan properties of the battery may be improved.

The molar fraction may be measured as follows. First, the copolymer in a powder state is subjected to GC/MS analysis using EQC-0107 (Pyrolyzer (PY-2020/Agilent6890N GC/5973N MSD)) to identify a correct functional group. Thereafter, solid NMR (Agilent 600 MHz NMR) or solution NMR (Bruker 600 MHz NMR) is performed to confirm the content ratio for each composition from the peak integral value of a measured graph.

In the copolymer, the unit derived from a poly(vinylalcohol) may include a unit of Formula 1 below.

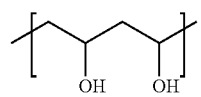

[Formula 1]

The unit derived from an ionized and substituted acrylate includes a unit of Formula 2 below, and in Formula 2, R may be each independently at least one metal cation selected from the group consisting of Na, Li, and K.

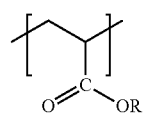

[Formula 2]

Furthermore, the copolymer may include 2000 to 3000 units of Formula 1 and 1000 to 2000 units of Formula 2.

The copolymer may be a block copolymer formed by including a unit derived from a poly(vinylalcohol) and a unit derived from an ionized and substituted acrylate. That is, the copolymer may have a structure in which a unit block derived from a poly(vinylalcohol) and a unit block derived from an acrylate ionized are linearly connected, and the structure may be a structure constituting a main chain.

The unit derived from a poly(vinylalcohol) and the unit derived from an ionized and substituted acrylate means a structure formed by the addition reaction of a poly(vinylalcohol) unit and an acrylate unit both having a double bond. In the case of the acrylate, a substituent bonded to an ester in the final copolymer structure and a substituent in a raw material may not necessarily match.

The ionized and substituted acrylate may comprise at least one selected from the group consisting of sodium acrylate and lithium acrylate, and preferably sodium acrylate.

The sodium acrylate and the lithium acrylate may be formed by a process of copolymerizing an alkyl acrylate with a monomer, and then adding an excessive amount of sodium ions or a lithium ion aqueous solution thereto to perform substitution. At this time, in the final copolymer structure, the unit derived from an acrylate may be regarded as a unit derived from sodium acrylate or a unit derived from lithium acrylate regardless of an acrylate (for example, alkyl acrylate) used as a raw material.

The copolymer may include the unit derived from a poly(vinylalcohol) and the unit derived from an ionized and substituted acrylate at a weight ratio of 6:4 to 8:2. When the unit derived from a poly(vinylalcohol) and the unit derived from an ionized and substituted acrylate are included in the above weight ratio range, adsorption onto particles is achieved due to poly(vinylalcohol) having a hydrophilic group so that dispersibility is maintained at an appropriate level, and the adsorbed polymer forms a film after being dried, so that stable adhesion may be exhibited. In addition, the formed film forms a uniform SEI film having a high density during charging and discharging of a battery, and thus, may have an advantage of assisting in the improvement of battery performance.

When the poly(vinylalcohol) is included in an amount less than the above weight ratio range, the hydrophilic properties thereof are weakened, so that the solid content which may be dissolved in water is reduced, and a binder is highly likely to float on the surface of an electrode, thereby affecting the performance of the battery. In addition, although adsorption onto the surface of a negative electrode active material which is hydrophobic may be archived, dispersion may be problematic. When the poly(vinylalcohol) is included in an amount greater than the above weight ratio range, due to the unique properties of PVA, bubbles are generated in a large amount during dissolving or mixing and particles are adsorbed onto the bubbles and aggregated, thereby generating macroparticles which are not dispersed. This indicates a deterioration in cell performance, and may cause various problems.

The copolymer may have a weight average molecular weight of 100,000 to 500,000. When the weight average molecular weight of the copolymer is less than 100,000, the dispersion between the copolymers is weakened to increase the possibility of aggregation between binders, and the improvement in charge/discharge lifespan properties may not be easily achieved. When the weight average molecular weight of the copolymer is greater than 500,000, dissolving the copolymer to a high concentration may not be easily achieved, so that it is not suitable for increasing the solid content of the negative electrode slurry. Furthermore, gelation is more likely to occur during polymerization.

The binder may be included in the negative electrode active material layer in an amount of 18 wt % to 22 wt %, specifically 18 wt % to 21 wt %, and more specifically 19 wt % to 21 wt %. When the binder is composed of the copolymer, the copolymer may be included in the negative electrode active material layer in the content range described above.

When the content of the binder is less than 18 wt %, the amount of copolymers of a small unit which are generated from the copolymer at the time of the volume expansion of the silicon particles is not sufficient, so that it is difficult to secure a conductive path. Accordingly, the lifespan properties of the battery are deteriorated. However, when the content of the binder is greater than 22 wt %, the negative electrode active material, the carbon black, and the binder are not smoothly dispersed in the negative electrode slurry, so that the content of the binder or the content of the carbon black in the negative electrode is not uniform. As a result, the resistance in the negative electrode becomes not uniform and the lifespan properties of the battery or other performance properties thereof are deteriorated.

The weight ratio of the silicon particles and the binder may be 1:0.228 to 1:0.343, specifically 1:0.242 to 1:0.329, and more specifically 1:0.257 to 1:0.315. When the above range is satisfied, a negative electrode slurry having a high phase stability may be formed.

In some cases, the negative electrode may further include an additive. The additive may be at least one of a pore former, a dispersant, a leveling agent, a dopant, and the like.

<Secondary Battery>

The present invention provides a secondary battery including a positive electrode, a negative electrode, an electrolyte, and a separator. The negative electrode is the same as the negative electrode of an embodiment described above, and the secondary battery may be a lithium secondary battery.

The secondary battery may be manufactured according to a typical method known in the art. For example, the secondary battery may be manufactured by placing a separator between a positive electrode and a negative electrode, and then introducing an electrolyte in which a lithium salt is dissolved thereto.

The positive electrode may include a positive electrode active material. The positive electrode active material may be preferably a lithium transition metal oxide. For example, the positive electrode active material may be one or more mixtures selected from the group consisting of $Li_{x1}CoO_2$ ($0.5<x1<1.3$), $Li_{x2}NiO_2$ ($0.5<x2<1.3$), $Li_{x3}MnO_2$ ($0.5<x3<1.3$), $Li_{x4}Mn_2O_4$ ($0.5<x4<1.3$), $Li_{x5}(Ni_{a1}Co_{b1}Mn_{c1})O_2$ ($0.5<x5<1.3$, $0<a1<1$, $0<b1<1$, $0<c1<1$, $a1+b1+c1=1$), $Li_{x6}Ni_{1-y1}Co_{y1}O_2$ ($0.5<x6<1.3$, $0<y1<1$), $Li_{x7}Co_{1-y2}Mn_{y2}O_2$ ($0.5<x7<1.3$, $0\leq y2<1$), $Li_{x8}Ni_{1-y3}Mn_{y3}O_2$ ($0.5<x8<1.3$, $0\leq y3<1$), $Li_{x9}(Ni_{a2}Co_{b2}Mn_{c2})O_4$ ($0.5<x9<1.3$, $0<a2<2$, $0<b2<2$, $0<c2<2$, $a2+b2+c2=2$), $Li_{x10}Mn_{2-z1}Ni_{z1}O_4$ ($0.5<x10<1.3$, $0<z1<2$), $Li_{x11}Mn_{2-z2}Co_{z2}O_4$ ($0.5<x11<1.3$, $0<z2<2$), $Li_{x12}CoPO_4$ ($0.5<x12<1.3$), and $Li_{x13}FePO_4$ ($0.5<x13<1.3$).

As the separator included in the lithium secondary battery according to the present invention, a porous polymer film which has been typically used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present invention is not limited thereto.

The electrolyte included in the lithium secondary battery according to the present invention may be one or more mixed organic solvents selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

In addition, the electrolyte according to the present invention may further include a lithium salt, and the lithium salt may include, as a cation, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be a secondary battery having a cylindrical shape, a quadrangular shape, or a pouch shape, and is not particularly limited thereto as long as it is a charge and discharge device.

In addition, the present invention provides a battery module including the lithium secondary battery as a unit cell, and a battery pack including the battery module.

The battery pack may be used as a power source of one or more medium-and-large sized devices selected from the group consisting of a power tool, an electric car including an electric vehicle (EV), a hybrid electric vehicle (HEV), and a plug-in hybrid electric vehicle (PHEV), and a power storage system.

Hereinafter, examples of the present invention will be described in detail so that those skilled in the art can easily carry out the present invention. The present invention may, however, be embodied in many different forms and is not limited to the examples set forth herein.

PREPARATION EXAMPLE 1

Preparing Copolymer 26.7 g of methyl acrylate and 53.3 g of poly(vinylalcohol) were dissolved in 320 g of benzene and then stirred in a 1 L reaction vessel having a heater, a cooler, and a stirrer. Thereafter, 2.256 g of benzoyl peroxide was added thereto as an initiator, followed by adding 16.8 g of 1-butanethiol as a chain transfer reaction agent. The temperature of the reaction vessel was raised to 110° C. in a nitrogen atmosphere. After 4 hours of reaction, the initiator and a monomer were washed using methanol, and the resulting powder was stirred in an excessive amount of n-hexane. An excessive amount of a 5 N NaOH solution was added to the powder being stirred, and the mixture was stirred for 2 hours to substitute methyl of methyl acrylate with sodium (Na) ions. After the reaction, the mixture was settled to obtain powder, and the obtained powder was dried in a 60° C. oven to obtain a copolymer finally synthesized.

The weight average molecular weight of the prepared copolymer was 360,000, and the weight ratio of a unit derived from a poly(vinylalcohol) and a unit derived from an acrylate in which methyl was substituted with Na ions was 6.7:3.3.

In the copolymer, the molar fraction of the unit derived from an ionized and substituted acrylate among units except for the unit derived from a poly(vinylalcohol) was 100 mol %.

The molar fraction was measured as follows. First, the copolymer in a powder state was subjected to GC/MS analysis using EQC-0107 (Pyrolyzer (PY-2020/Agilent6890N GC/5973N MSD)) to identify a correct functional group.

Thereafter, solid NMR (Agilent 600 MHz NMR) or solution NMR (Bruker 600 MHz NMR) was performed to confirm the content ratio for each composition from the peak integral value of a measured graph. As a result, the molar fraction of the unit derived from an ionized and substituted acrylate was confirmed.

PREPARATION EXAMPLE 2

Preparing Copolymer 26.7 g of methyl acrylate and 53.3 g of poly(vinylalcohol) were dissolved in 320 g of benzene and then stirred in a 1 L reaction vessel having a heater, a cooler, and a stirrer. Thereafter, 2.256 g of benzoyl peroxide was added thereto as an initiator, followed by adding 16.8 g of 1-butanethiol as a chain transfer reaction agent. The temperature of the reaction vessel was raised to 110° C. in a nitrogen atmosphere. After 4 hours of reaction, the initiator and a monomer were washed using methanol, and the resulting powder was stirred in an excessive amount of n-hexane. An excessive amount of a 1 N NaOH solution was added to the powder being stirred, and the mixture was stirred for 2 hours to substitute methyl of methyl acrylate with Na ions. After the reaction, the mixture was settled to obtain powder, and the obtained powder was dried in a 60° C. oven to obtain a copolymer finally synthesized.

The weight average molecular weight of the prepared copolymer was 360,000, and the weight ratio of a unit derived from a poly(vinylalcohol) and a unit derived from an acrylate in which methyl was substituted with Na ion (i.e., sodium acrylate) was 6.7:3.3.

In the copolymer, the molar fraction of the unit derived from an ionized and substituted acrylate among units except for the unit derived from a poly(vinylalcohol) was 58.6 mol %.

PREPARATION EXAMPLE 3

Preparing Copolymer 26.7 g of methyl acrylate and 53.3 g of poly(vinylalcohol) were dissolved in 320 g of benzene and then stirred in a 1 L reaction vessel having a heater, a cooler, and a stirrer. Thereafter, 2.256 g of benzoyl peroxide was added thereto as an initiator, followed by adding 16.8 g of 1-butanethiol as a chain transfer reaction agent. The temperature of the reaction vessel was raised to 110° C. in a nitrogen atmosphere. After 4 hours of reaction, the initiator and a monomer were washed using methanol, and the resulting powder was stirred in an excessive amount of n-hexane. After the reaction, the mixture was settled to obtain powder, and the obtained powder was dried in a 60° C. oven to obtain a copolymer finally synthesized.

The weight average molecular weight of the prepared copolymer was 360,000, and the weight ratio of a unit derived from a poly(vinylalcohol) and a unit derived from an acrylate (unit not substituted) was 6.7:3.3.

In the copolymer, the molar fraction of the unit derived from an ionized and substituted acrylate among units except for the unit derived from a poly(vinylalcohol) was 0 mol %.

TABLE 1

|  | Type of binder | Weight ratio of negative electrode active material, carbon black, and binder | Negative electrode active material | Size of silicon particle (μm) | Carbon black specific surface area ($m^2/g$) | Volatile matter (%) of carbon black |
| --- | --- | --- | --- | --- | --- | --- |
| Example 1 | Preparation Example 1 | 70:10:20 | Silicon | 6 | 63 | 0.15 |
| Example 2 | Preparation Example 1 | 70:10:20 | Silicon | 3 | 63 | 0.15 |

TABLE 1-continued

|  | Type of binder | Weight ratio of negative electrode active material, carbon black, and binder | Negative electrode active material | Size of silicon particle ($\mu$m) | Carbon black specific surface area ($m^2/g$) | Volatile matter (%) of carbon black |
|---|---|---|---|---|---|---|
| Example 3 | Preparation Example 1 | 70:10:20 | Silicon | 15 | 63 | 0.15 |
| Example 4 | Preparation Example 1 | 70:10:20 | Silicon | 6 | 45 | 0.4 |
| Example 5 | Preparation Example 2 | 70:10:20 | Silicon | 6 | 63 | 0.15 |
| Comparative Example 1 | Preparation Example 1 | 70:15:15 | Silicon | 6 | 63 | 0.15 |
| Comparative Example 2 | Preparation Example 1 | 70:5:25 | Silicon | 6 | 63 | 0.15 |
| Comparative Example 3 | Preparation Example 1 | 65:10:25 | Silicon | 6 | 63 | 0.15 |
| Comparative Example 4 | Preparation Example 1 | 80:10:10 | Silicon | 6 | 63 | 0.15 |
| Comparative Example 5 | Preparation Example 3 | 70:10:20 | Silicon | 6 | 63 | 0.15 |
| Comparative Example 6 | CMC, SBR | 70:10:20 | Silicon | 6 | 63 | 0.15 |

The specific surface area of carbon black was measured by a Brunauer-Emmett-Teller (BET) measurement method according to a nitrogen adsorption method. The volatile matter of carbon black is a weight loss rate calculated through the following equation after heat treating the carbon black at 700° C. for 2 hours.

Weight loss rate=[(Weight of carbon black before heat treatment−Weight of carbon black after heat treatment)/Weight of carbon black before heat treatment]×100

(1) Manufacturing Negative Electrode (1) Manufacturing Negative Electrode Slurry 7.14 g of the copolymer prepared in Preparation Example 1 was added to 62.89 g of water, and the mixture was mixed with a Homomixer at 70° C. and 2500 rpm for 180 minutes to prepare a 10.2 wt % copolymer dispersion solution in which the copolymer is dispersed. To 70.03 g of the dispersion solution, 3.57 g of carbon black, 44.25 g of water, and 25 g of silicon particles having an average particle diameter ($D_{50}$) of 6 $\mu$m were introduced, and the mixture was dispersed with a Homomixer at 2500 rpm for 60 minutes to prepare a composition for secondary battery electrode. The composition for secondary battery electrode prepared as described above was a mixed solution (solid content 25.0 wt %) in which the silicon particles, the carbon black, and the copolymer were mixed at a weight ratio of 70:10:20.

(2) Manufacturing Negative Electrode

The prepared negative electrode slurry was applied on a negative electrode current collector having a thickness of 15 $\mu$m such that the electrode loading (mg/cm$^2$) is 4.98 mg per unit area, and the current collector applied with the slurry was dried in a 130° C. oven for 10 hours. Thereafter, the dried current collector was roll pressed with a pressure of 15 Mpa between rolls heated to 50° C. to manufacture a negative electrode (secondary battery electrode) having a final thickness (current collector+active material layer) of 33.7 $\mu$m and a loading amount of the negative electrode active material layer of 50.4 mg/25 cm$^2$.

EXAMPLES 2 TO 5 AND COMPARATIVE EXAMPLES 1 TO 5

Manufacturing Negative Electrode

A negative electrode was manufactured in the same manner as in Example 1 except that negative electrode slurry was prepared as shown in Table 1 above.

COMPARATIVE EXAMPLE 6

Manufacturing Negative Electrode (1) Preparing Negative Electrode Slurry 0.89 g of carboxymethylcellulose (CMC) powder was introduced to 82.55 g of water, and the mixture was mixed with a Homomixer at 2500 for 180 minutes to prepare a CMC aqueous solution containing CMC in an amount of 1.07 wt %. To 12.52 g of the aqueous solution, 3.57 g of carbon black was introduced, and the mixture was mixed with a Homomixer at 2500 rpm for 10 minutes to prepare a dispersion solution. To the dispersion solution, 25 g of silicon particles having an average particle diameter ($D_{50}$) of 6 $\mu$m were introduced, and the mixture was mixed using a Planetary mixer at 60 rpm for 30 minutes. Thereafter, 70.93 g of a CMC aqueous solution was further introduced to the dispersion solution, and mixed at 60 rpm for 20 minutes. Finally, 15.47 g of an aqueous solution containing styrene butadiene rubber (SBR aqueous solution) having a solid content of 40.4 wt % was introduced thereto, and then mixed with a Homomixer at 1000 rpm for 10 minutes to prepare a composition for secondary battery. The composition for secondary battery prepared as described above was a mixed solution (solid content 25.0 wt %) in which the silicon particles, the carbon black, the CMC, and the SBR were mixed at a weight ratio of 70:10:2.5:17.5.

(2) Manufacturing of Negative Electrode

The prepared negative electrode slurry was applied on a negative electrode current collector having a thickness of 15 $\mu$m such that the electrode loading (mg/cm$^2$) is 4.98 mg per unit area, and the current collector applied with the slurry was dried in a 130° C. oven for 10 hours. Thereafter, the dried current collector was roll pressed with a pressure of 15

Mpa between rolls heated to 50° C. to manufacture a negative electrode (secondary battery electrode) having a final thickness (current collector+active material layer) of 33.7 μm and a loading amount of the negative electrode active material layer of 50.4 mg/25 cm$^2$.

EXPERIMENTAL EXAMPLE 1

Capacity Retention Rate According to Cycle

The cycle properties were evaluated for the negative electrode manufactured in each of Examples 1 to 5 and Comparative Examples 1 to 6, and the evaluation results are shown in FIG. 1 to FIG. 6 and Table 1.

(1) Manufacturing Coin Half-Cell

A lithium (Li) metal thin film cut into a circular shape of 1.76715 cm$^2$ was prepared as a positive electrode. A porous polyethylene separator was interposed between the positive electrode and the manufactured negative electrode to assemble a battery. To the assembled battery, an electrolyte solution (dimethyl carbonate (DMC))/fluoroethylene carbonate (FEC)=7/3 (volume ratio), vinylene carbonate of 3 wt %, lithium hexaborphosphate (LiPF$_6$) of 1 M concentration) were injected to manufacture a lithium coin half-cell.

(2) Evaluation

Each coin half-cell was charged and discharged under the following conditions.

1$^{st}$ Cycle: Charging was performed with a 0.1 C constant current, and when 0.005 C and 0.5 V were reached, constant voltage charge (0.05 V) was performed. Discharging was performed with a constant current (0.1 C) to 1.5 V.

2$^{nd}$ Cycle: Charging was performed with a 0.1 C constant current, and when 0.005 C and 0.5 V were reached, constant voltage charge (0.05 V) was performed. Discharging was performed with a constant current (0.1 C) to 1.0 V.

3$^{rd}$ to 30$^{th}$ cycle: Charging was performed with a 0.5 C constant current, and when 0.005 C and 0.5 V were reached, constant voltage charge (0.05 V) was performed. Discharging was performed with a constant current (0.5 C) to 1.0 V.

The capacity retention rate each thereof was derived by the following calculation.

Capacity retention rate (%)=(n time discharge capacity/1 time discharge capacity)×100

TABLE 2

| Negative electrode | Capacity retention rate (%, 30 cycles) |
| --- | --- |
| Example 1 | 78.2 |
| Example 2 | 60.5 |
| Example 3 | 69.0 |
| Example 4 | 38.9 |
| Example 5 | 50.1 |
| Comparative Example 1 | 37.3 |
| Comparative Example 2 | 31.2 |
| Comparative Example 3 | 35.5 |
| Comparative Example 4 | 16.0 |
| Comparative Example 5 | 12.2 |
| Comparative Example 6 | 20.1 |

Referring to Table 2 and FIG. 1 to FIG. 6, it can be confirmed that the capacity retention rate of each of Examples in which a specific binder described above was used in an appropriate content (18 wt % to 22 wt %) and silicon particles were used as a negative electrode active material was superior to that of each of Comparative Examples.

Figure 2:
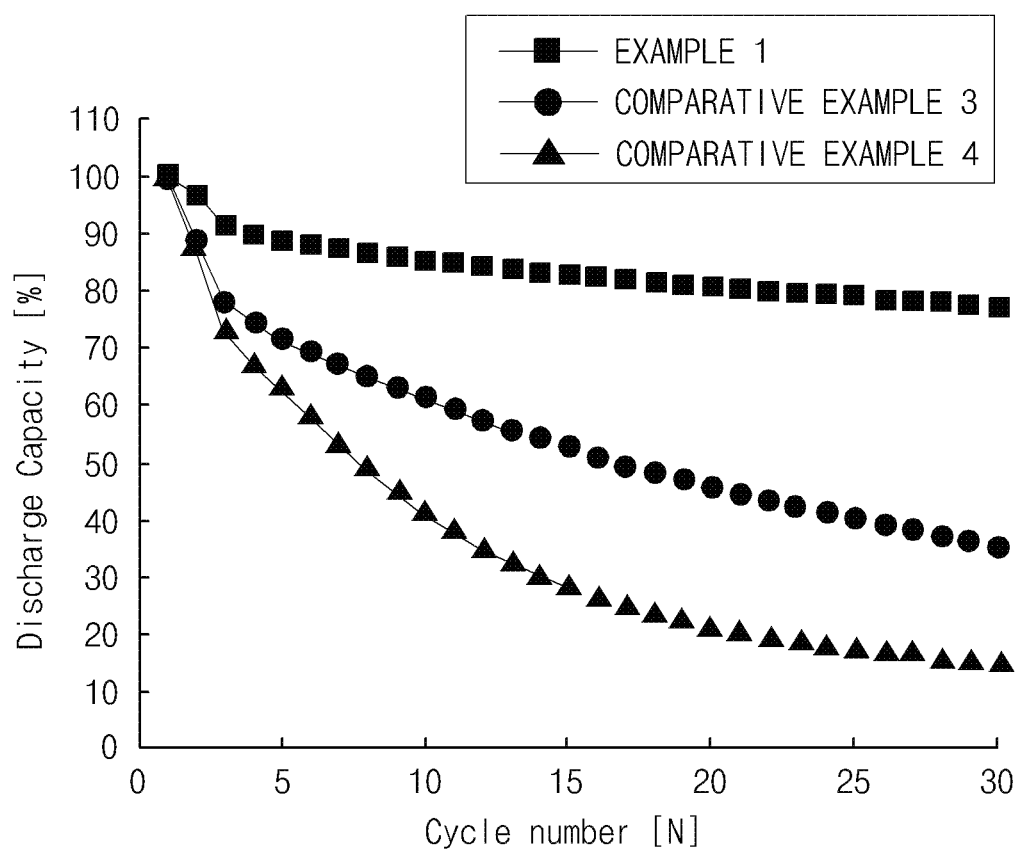
FIG. 2 is a graph showing the capacity retention rate of batteries according to cycle, the batteries using the negative electrode of Example 1, Comparative Example 3, and Comparative Example 4, respectively.

Specifically, referring to Table 2 and FIGS. 1 to 2, the capacity retention rate of Example 1 in which the binder was used in an amount of 18 wt % to 22 wt % was higher than that of each of Comparative Example 1 to Comparative Example having a binder content of outside the above range. Accordingly, it can be seen that the use of a binder in an appropriate content is a major factor with respect to battery performance.

Figure 3:
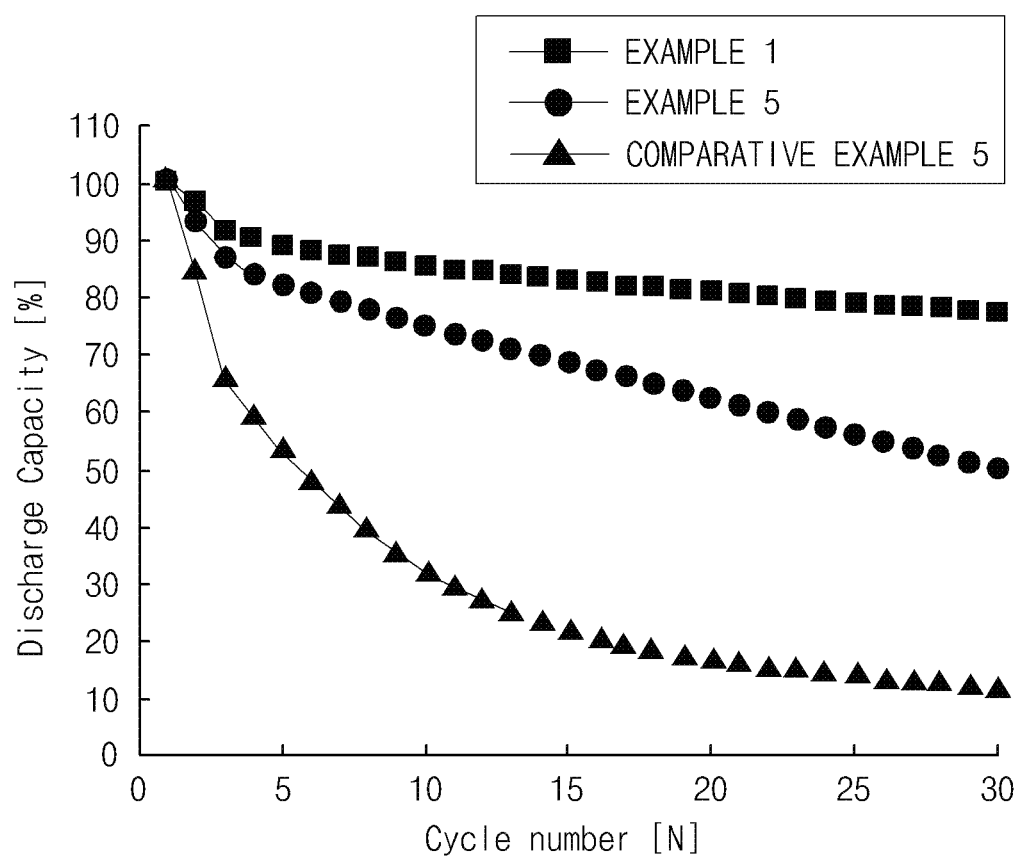
FIG. 3 is a graph showing the capacity retention rate of batteries according to cycle, the batteries using the negative electrode of Example 1, Example 5, and Comparative Example 5, respectively.

Referring to Table 2 and FIG. 3, Comparative Example 6 in which a copolymer including a unit derived from a poly(vinylalcohol) and a unit derived from an acrylate not ionized and substituted was used as a binder exhibited a capacity retention rate significantly lower than that of Example 1. In addition, Example 1 in which a binder having units derived from an acrylate all ionized and substituted was used had a higher capacity retention rate than Example 5 in which a binder having only 58.6 mol % of units derived from an ionized and substituted acrylate.

Figure 4:
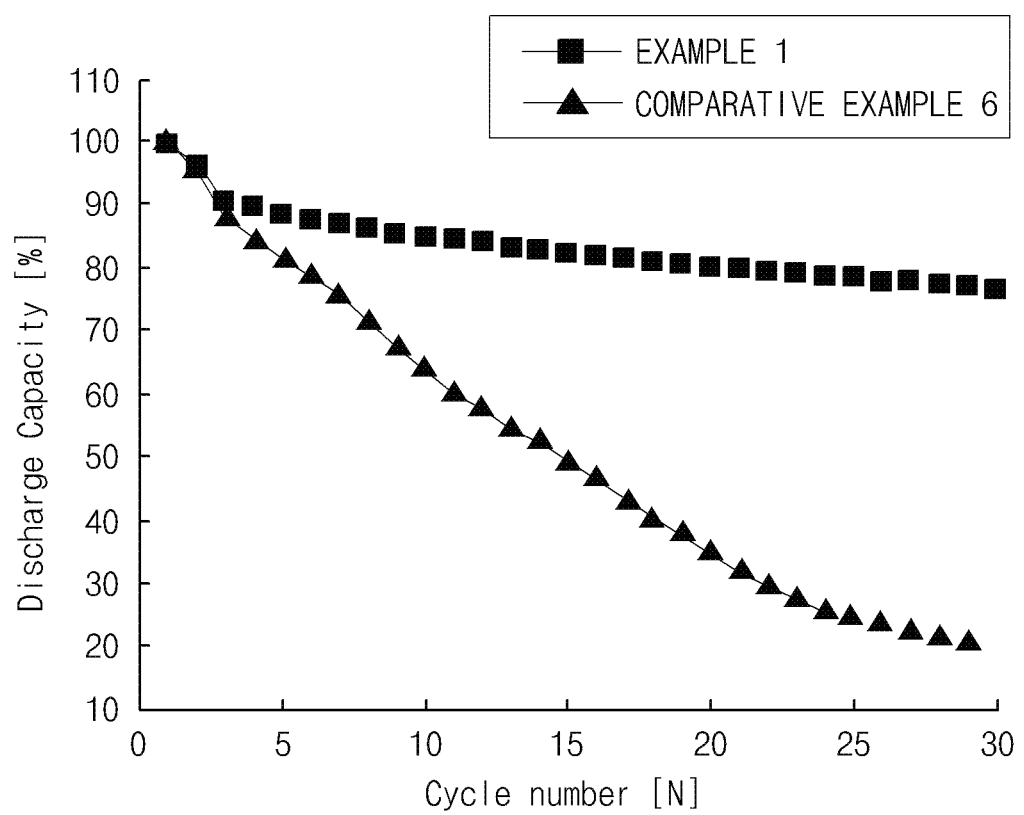
FIG. 4 is a graph showing the capacity retention rate of batteries according to cycle, the batteries using the negative electrode of Example 1 and Comparative Example 6, respectively.

Referring to Table 2 and FIG. 4, compared with Comparative Example 7 in which CMC and SBR which are typical binders were used, Example 1 had a significantly higher capacity retention rate.

Figure 5:
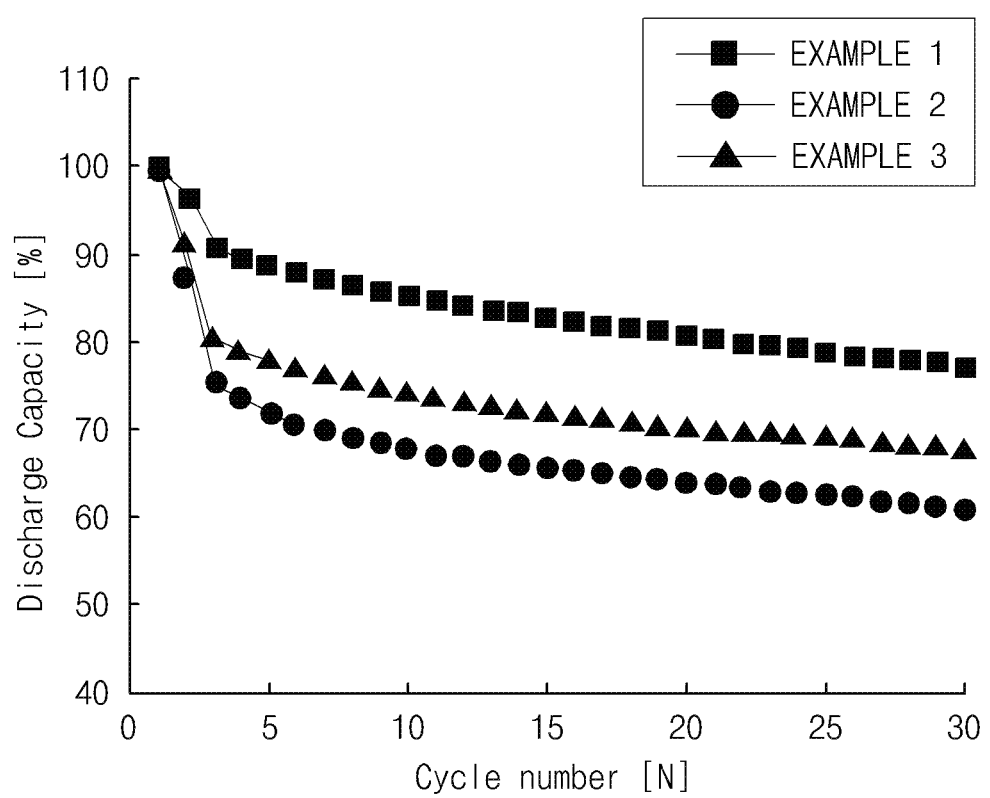
FIG. 5 is a graph showing the capacity retention rate of batteries according to cycle, the batteries using the negative electrode of Example 1, Example 2, and Example 3, respectively.

Referring to Table 2 and FIG. 5, the capacity retention rate of Example 1 in which the average particle diameter of the silicon particles was in the range of 4 μm to 10 μm was higher than those of Examples 2 and 3 in which silicon particles not satisfying the above average particle diameter range were used.

Figure 6:
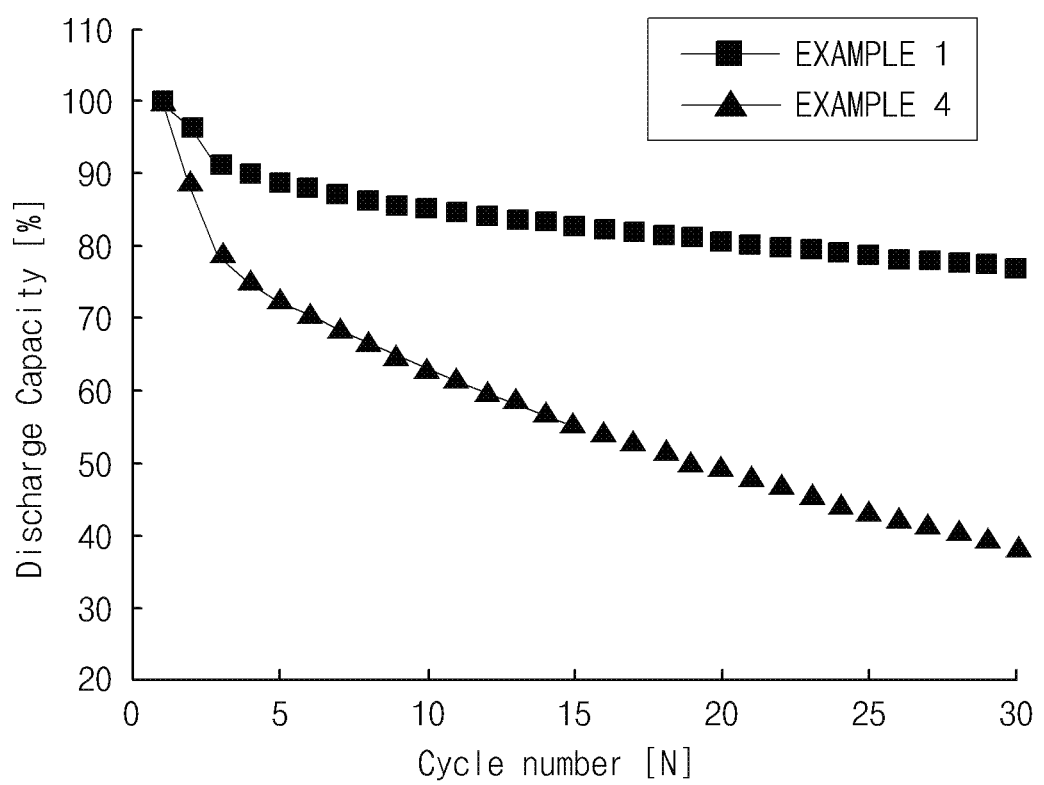
FIG. 6 is a graph showing the capacity retention rate of batteries according to cycle, the batteries using the negative electrode of Example 1 and Example 4, respectively.

Referring to Table 2 and FIG. 6, it can be seen that when the specific surface area and volatile matter of carbon black are at an appropriate level, the capacity retention rate is improved.

The invention claimed is:

1. A negative electrode comprising:
a current collector and a negative electrode active material layer disposed on the current collector, wherein
the negative electrode active material layer includes:
a negative electrode active material;
carbon black; and
a binder, wherein
the negative electrode active material includes silicon particles,
the binder includes a copolymer containing a poly(vinylalcohol) unit and an ionized and substituted acrylate unit, the binder being included in the negative electrode active material layer in an amount of 18 wt % to 22 wt %,
an average particle diameter (D$_{50}$) of the silicon particles is 5 μm to 7 μm,
wherein, in the binder, a molar fraction of the ionized and substituted acrylate among units except for the poly(vinylalcohol) unit is 98 mol % to 100 mol %, and
wherein a specific surface area of the carbon black is 50 m$^2$/g to 65 m$^2$/g.

2. The negative electrode of claim 1, wherein the poly(vinylalcohol) unit comprises a unit of Formula 1 below:

[Formula 1]

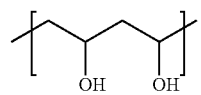

and the ionized and substituted acrylate unit comprises a unit of Formula 2 below:

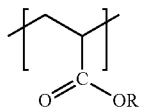 [Formula 2]

wherein in Formula 2, R is each independently at least one metal selected from the group consisting of Na, Li, and K.

3. The negative electrode of claim 1, wherein the copolymer comprises the poly(vinylalcohol) unit and the ionized and substituted acrylate unit at a weight ratio of 6:4 to 8:2.

4. The negative electrode of claim 1, wherein the ionized and substituted acrylate is at least one selected from the group consisting of sodium acrylate and lithium acrylate.

5. The negative electrode of claim 1, wherein a weight average molecular weight of the copolymer is 100,000 to 500,000.

6. The negative electrode of claim 1, wherein, when the carbon black is heat treated at 600° C. to 700° C. for 90-180 minutes, the weight loss rate of the carbon black is 0.05% to 0.25%.

7. The negative electrode of claim 1, wherein the carbon black is included in the negative electrode active material layer in an amount of 7 wt % to 13 wt %.

8. The negative electrode of claim 1, wherein
the negative electrode active material further comprises graphite,
the silicon particles have a $D_{10}$ of 0.2 μm or greater and a $D_{90}$ of 20 μm or less,
the difference between the $D_{10}$ and the $D_{90}$ is 15 μm or less, and
the negative electrode further comprises an additive.

9. A secondary battery comprising:
the negative electrode of claim 1;
a positive electrode;
a separator interposed between the positive electrode and the negative electrode; and
an electrolyte.

10. The negative electrode of claim 1, wherein the copolymer comprises 2 mol % or less of an acrylate that is not ionized and substituted.

11. The negative electrode of claim 1, wherein the copolymer does not contain an acrylate that is not ionized and substituted.

12. The negative electrode of claim 1, wherein an average particle diameter ($D_{50}$) of the silicon particles is 6 μm to 7 μm.

13. The negative electrode of claim 1, wherein an average particle diameter ($D_{50}$) of the silicon particles is 5 μm to 6 μm.

14. The negative electrode of claim 1, wherein the carbon black is included in the negative electrode active material layer in an amount of 8 wt % to 12 wt.

15. The negative electrode of claim 1, wherein the carbon black is included in the negative electrode active material layer in an amount of 9 wt % to 11 wt %.

16. The negative electrode of claim 1, wherein a weight ratio of the silicon particles and the binder is 1:0.228 to 1:0.343.

17. The negative electrode of claim 1, wherein a weight ratio of the silicon particles and the binder is 1:0.242 to 1:0.329.

* * * * *